United States Patent [19]

Ninomiya et al.

[11] Patent Number: 4,611,292
[45] Date of Patent: Sep. 9, 1986

[54] ROBOT VISION SYSTEM

[75] Inventors: Takanori Ninomiya, Yokohama; Yasuo Nakagawa, Chigasaki, both of Japan

[73] Assignee: Hitachi, Ltd., Tokyo, Japan

[21] Appl. No.: 537,095

[22] Filed: Sep. 29, 1983

[30] Foreign Application Priority Data

Oct. 6, 1982 [JP] Japan .................. 57-174522
Nov. 12, 1982 [JP] Japan .................. 57-197473
Nov. 19, 1982 [JP] Japan .................. 57-201931

[51] Int. Cl.⁴ ............... G01B 11/24; G01B 11/03; G01B 11/22
[52] U.S. Cl. .................. 364/559; 364/513; 382/48; 358/101; 356/376
[58] Field of Search .......... 364/559, 513; 356/376, 356/12, 13; 358/96, 101, 88, 89, 90, 93, 101, 107; 382/8, 46, 48

[56] References Cited

U.S. PATENT DOCUMENTS

| | | | |
|---|---|---|---|
| 3,806,253 | 4/1974 | Denton | 356/376 |
| 3,894,802 | 7/1975 | Higgins | 356/376 |
| 4,219,847 | 8/1980 | Pinkney et al. | 364/559 |
| 4,305,130 | 12/1981 | Kelley et al. | 901/46 |
| 4,343,553 | 8/1982 | Nakagawa et al. | 356/376 |
| 4,399,554 | 8/1983 | Perkins, III et al. | 356/376 |
| 4,435,837 | 3/1984 | Abernathy | 364/559 |
| 4,450,579 | 5/1984 | Nakashima et al. | 382/48 |
| 4,485,409 | 11/1984 | Schumacher | 358/107 |
| 4,486,842 | 12/1984 | Hermann | 364/513 |

OTHER PUBLICATIONS

Shirai et al, "Extraction of the Line Drawing of 3-Dimensional Objects by Sequential Illumination from Several Directions", Pattern Recognition, vol. 4, No. 4, pp. 343-351, 1972.

Bamba, T. et al, "A Visual Sensor for Arc-Welding Robots", 11th Int. Symp. on Industrial Robots (1981) pp. 151-158.

Vander Burg, G. J. et al, "A Vision System for Real Time Control of Robots", 9th Int. Symp. on Industrial Robots (1979) pp. 213-231.

Albus, J. et al, "Six-Dimensional Vision System", Proc. of SPIE., vol. 336, Robot Vision (May 1982), pp. 142-153.

Primary Examiner—Errol A. Krass
Assistant Examiner—Joseph L. Dixon
Attorney, Agent, or Firm—Beall Law Offices

[57] ABSTRACT

A method and an apparatus for detecting the position and posture of an object (5, 9, 10) are characterized by two planar light beams (3a, 3b) alternately projected on the object (5, 9, 10) to be handled and intersection lines (A, B) formed between the two planar light beams (3a, 3b) and the object (5, 9, 10) which are imaged by a single image pickup device (2) positioned between the two planar light beams (3a, 3b).

A bright line occurring at a junction between an edge of the object and an intersection line is separated, extracted and transformed into an actual coordinate in a three dimensional coordinate system (x, y, z) by referring to corresponding relationships between the actual coordinate system (x, y, z) and a scanning coordinate system (i, j) so that the position and posture of the object (5, 9, 10) are detected in three dimensions.

32 Claims, 26 Drawing Figures

ROBOT VISION SYSTEM

BACKGROUND OF THE INVENTION

The present invention relates to a method of detecting the position and posture of an object to be handled by sensing the optical image of the object and analyzing it, and an apparatus for performing the method.

Also, the present invention relates to a robot vision system which detects the position and posture of an object to be handled by sensing the optical image of the object and analytically processing it, the detected results being used for controlling the arm mechanism of a robot.

Further, the present invention relates to a robot vision system which is well suited for installation on, especially, the hand of a robot, among robot vision systems which detect the position and posture of an object to be handled in an assembling operation to be executed by a robot.

As an expedient for detecting the position of an object, there has heretofore been a system wherein the whole object is uniformly illuminated and has its optical image converted into an electric signal by the use of an image pickup device such as TV camera, the electric signal is binary-coded on the basis of a certain reference signal, and the binary-coded picture signal is processed. With this system, however, it is necessary that the surface of the object to be handled is greatly different from the background thereof in color or brightness, so only the object can be separated and extracted on a picture by the binary-coding. Moreover, the system cannot detect the position of the object in a depthwise direction. Therefore, in a case where the object needs to be grasped or to have a component mounted thereon as in an assembling operation which is executed by a robot, the object must lie at a known distance from the detector. Accordingly, the system resorting to the binary-coded picture has the disadvantage that the objects to be handled are limited.

As a system for use in automatic welding by a robot, there has been one wherein a light segment detecting head is installed on the hand of the robot, and a detected light segment waveform is arithmetically processed to automatically detect a welding position, as disclosed in "A Visual Sensor for Arc-Welding Robots", Bamba, T., et al., 11th Int. Symp. on Industrial Robots, pp. 151-158 (1981). This system is limited, however, to handling objects characterized by grooves.

Furthermore, in an attempt to apply this system to the assembling operation, an NBS system (VanderBrug, G. J., et. al., "A Vision System for Real Time Control of Robots", 9th Int. Symp. on Industrial Robots, pp. 213-230, 1979) has been devised. In order to detect the position and posture of an object completely in three dimensions with this system, a robot arm carrying the detector thereon needs to be moved so as to view the object from several different angles. This leads to take a long time for the detection.

SUMMARY OF THE INVENTION

An object of the present invention is to eliminate the disadvantages of the prior arts described above, and to provide a method of detecting the position and posture of an object to be handled at high speed, as well as a small-sized and light-weight detection device for realizing the method.

Another object of the present invention is to provide a small-sized, light-weight vision system which detects three-dimensional positions and postures of objects at high speed without being effected by color or contrast between the object and its background, and which can be mounted on the hand of a robot.

Another object of the present invention is to provide a small-sized and light-weight robot vision system which detects the three-dimensional position and posture of an object to be handled at high speed without being affected by the color and brightness of the object.

To the accomplishment of the object, a method of detecting the position and posture of an object according to the present invention is characterized by two planar light beams alternately projected on the object to be handled. Intersection lines between the planar light beams and a surface of the object to be handled are imaged by a single image pickup device in a position between the two planar light beams. A bright line in a picture of the image thus obtained is separated and extracted, and the bright line is transformed into an actual coordinate in a three dimensional coordinate system by referring to a corresponding relationship, obtained in advance, between actual positions and a real positions in a reference picture, and is then analyzed to provide the position and posture of the object to be handled in three dimensions.

In addition, a device for detecting the position and posture of an object according to the present invention is also characterized by light sources which generate two planar light beams, a device which controls the light sources so as to switch and emit the two planar light beams, a single image pickup device which forms images of intersection lines between the planar light beams and the object to be handled and which is positioned between the planar light beams, a device which separates and extracts a bright line on a picture thus obtained, a device which stores a corresponding relationship between the line thus separated and extracted and actual coordinate positions, and computation means for analyzing the separated and extracted line by comparing it with the stored corresponding relationship.

While the present invention will now be described more in detail in conjunction with embodiments by referring to the drawings, it is a matter of course that they are mere examples for illustration and that various modifications and improvements can be made without departing from the scope of the present invention.

DETAILED DESCRIPTION OF THE INVENTION

Figure 1:
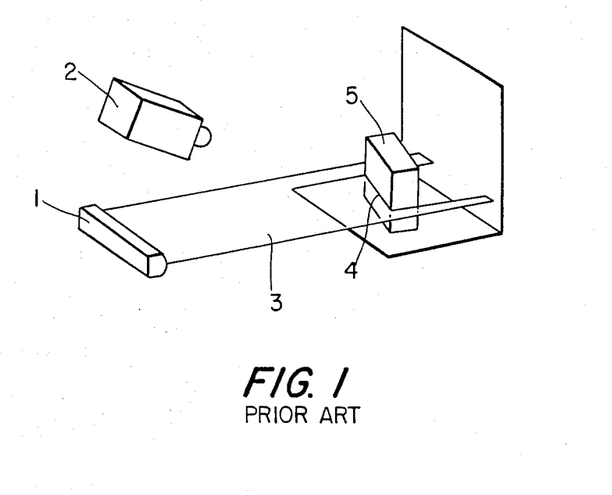
FIG. 1 is a perspective view showing a detector in a robot vision system using a light segmentation method.
Figure 2:
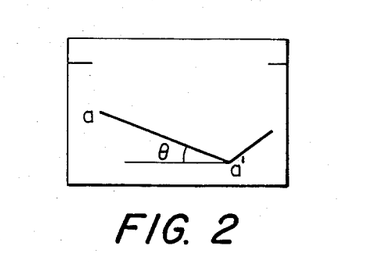
FIG. 2 is a diagram showing an example of a picture detected by the detector shown in FIG. 1.

In general, as a system for detecting the position and posture of an object without being affected by the colors thereof, there has been a system which applies a light segmentation method. It employs a detector which is constructed of a slit light source 1 and an image pickup device 2 as shown in FIG. 1. A light segment 4, which is the intersection line between the surface of an object 5 and a planar light beam 3 projected from the slit light source 1, is imaged by the image pickup device 2 in an oblique direction which defines a certain angle with the optic axis of the planar light beam 3. Then, the sectional shape of the object is obtained as shown in FIG. 2 by way of example. Since a point remoter from the detector lies in an upper position on a picture, the distance of the object from the detector and the lateral position thereof can be detected by extracting the light segment waveform and then detecting and processing the positions of points a and a' on the picture in FIG. 2. In addition, by detecting an angle $\theta$, it is possible to detect the rotational angle of the surface of the object 5 about an axis which is normal to a plane defined by the planar light beam 3.

Figure 3:
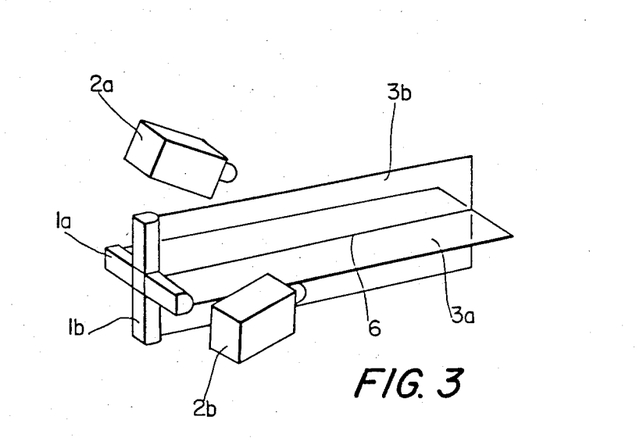
FIG. 3 is a perspective view showing a detector in which two detectors using a light segmentation method are combined.

Another system which applies the light segmentation method is shown in FIG. 3. Two light sources 1a, 1b are combined so as to emit planar light beams 3a, 3b intersecting each other. Two image pickup devices 2a, 2b are arranged for the respective planar light beam 3a, 3b, so as to image two light segments. Since such setup can detect the rotational angles of the surface of an object about two axes which are respectively normal to two non-parallel planes, the posture of the object can be detected in three dimensions without moving the detector. Moreover, besides the distance of the object from the detector, the sizes and positions of the object in two directions can be detected.

Since, however, such setup requires the two light sources and the two image pickup devices, it has the disadvantage that the detector becomes large in size. This also leads to the disadvantage that the application of the detector of the above setup is difficult in such a case where the relative positional relationship between the object to be handled and the hand of a robot needs to be precisely found by the use of the detector mounted on the hand.

Figures 4, 5:
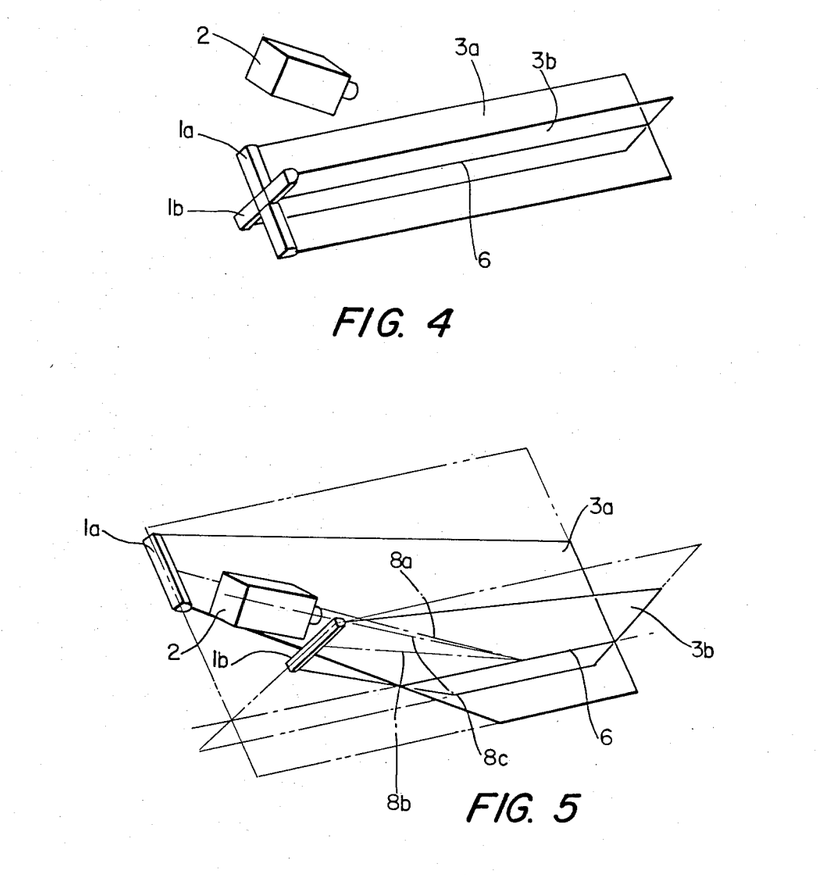
FIG. 4 is a perspective view of a detector which illustrates an underlying principle of the present invention.
FIG. 5 is a perspective view showing the typical setup of a detector according to the present invention.

A system setup shown in FIG. 4 is exemplified in order to clarify the following description which is quite similarly applicable to a setup shown in FIG. 5.

Figure 6A:
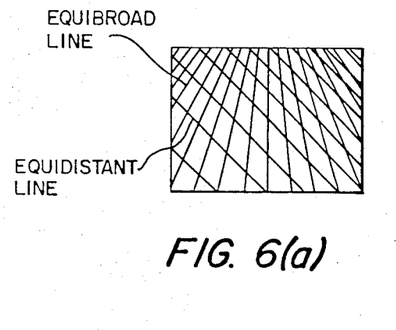
FIG. 6(a) is a diagram depicting equidistant lines and equibroad lines in an X - Z plane of the detector shown in FIG. 4.
Figure 6B:
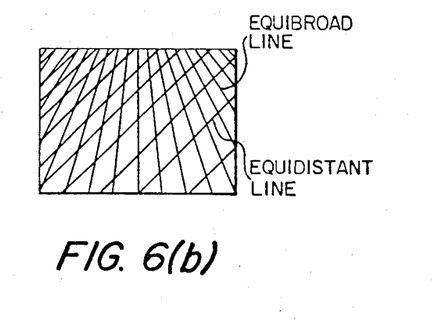
FIG. 6(b) is a diagram depicting equidistant lines and equibroad lines in a Y - Z plane of the detector shown in FIG. 4.

Referring to FIG. 4, when two light sources 1a, 1b are caused to alternately emit lights, light segments are detected by an image pickup device 2. The corresponding relationships between the detected light segments and the actual position of an object become oblique checkered patterns as shown in FIGS. 6(a) and 6(b). The corresponding relationships are stored in a memory device in advance by evaluating them by the use of an object of known dimensions and while the position thereof from the detector is being changed. In detecting the position and posture of the object, the corresponding relationships stored in advance and the positions on a picture, of the light segments detected by the image pickup device 2 are compared, whereby the actual position and inclination of the object can be found. In the present invention, two planar light beams 3a, 3b are alternately switched and projected, and the distances, positions and inclinations of the object from the detector on two planes not parallel to each other can be found, and hence, the three-dimensional position and posture of the object can be uniquely found on the basis of them.

It is supposed in the present invention that the detector or the object is roughly positioned beforehand so that the intersection line 6 between the two planar light beams 3a, 3b, may intersect the surface of the object, and that the relative position and posture between the detector and the object are precisely detected by the use of the robot vision system of the present invention.

Figure 7:
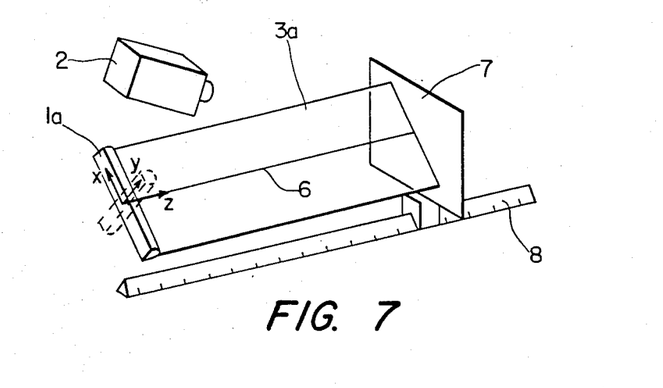
FIG. 7 is a perspective view of a detector for obtaining equidistant lines and equibroad lines.
Figure 8:
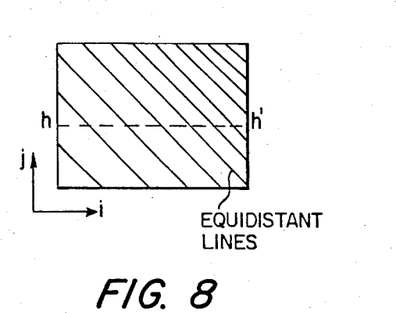
FIG. 8 is a diagram showing an example of equidistant lines.
Figure 9:
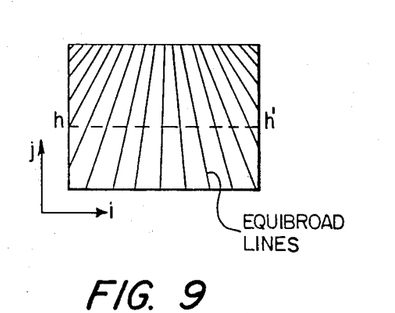
FIG. 9 is a diagram showing an example of equibroad lines.
Figure 10:
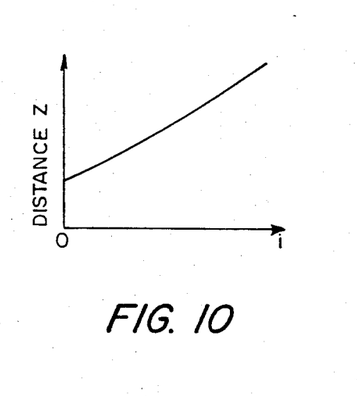
FIG. 10 is a two dimensional graph depicting the variation of the equidistant lines shown in FIG. 8.
Figure 11:
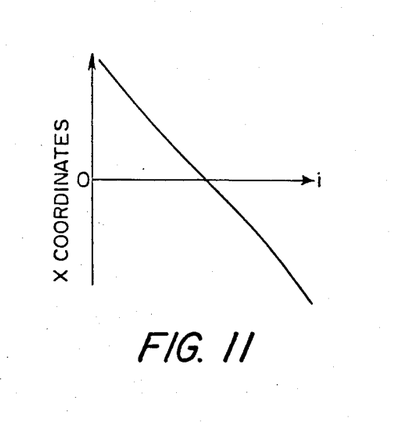
FIG. 11 is a two dimensional graph depicting the variation of the equibroad lines shown in FIG. 9.

Next, a method of finding the corresponding relationship between the position of the detected light segment on the picture and the actual position of the object will be explained with reference to FIG. 7. While only the case of the light source 1a shown in FIG. 4 will be described here, the cases of the light source 1b shown in FIG. 4 and light sources 1a, 1b shown in FIG. 5 are similar. As illustrated in FIG. 7, a coordinate system x-y-z is assumed wherein the intersection line 6 of the two planar light beams coincides with the z-axis and wherein the planar light beam 3a from the light source 1a coincides with the x-z plane. As shown in FIG. 7, a plane 7 which is perpendicular to the z-axis and which has an area larger than the field of view of the image pickup device 2 is erected on a graduated rail 8 so as to be translated in the direction of the z-axis. The positions of the light segments on the detection picture are found while the plane 6 is being brought away from the detector at intervals of, e.g., 1 cm. Then, a diagram of equidistant lines as shown in FIG. 8 is obtained. Subsequently, several planes 7 which are rectangles having fixed breadths are prepared, and they are similarly erected on the rail 8 perpendicularly to the z-axis and moved in the direction of the z-axis. The x-axial breadths of the planes 7 are set at in intervals of, e.g., 2 cm, and the loci of the end points of the light segments detected when the repective planes 7 are moved in the z-axial direction are found. Then, a diagram of equibroad lines (concerning x-coordinates) as shown in FIG. 9 is obtained. When, in the equidistant line diagram of FIG. 8 and the equibroad line diagram of FIG. 9, variations in the distance and x-directional position along certain horizontal lines h–h' on the diagrams are observed, they become as shown in FIG. 10 and FIG. 11, respectively. When they are expressed as a function z of the distance and a function x of the x-directional position at vertical coordinates j on the diagrams, with a variable being lateral coordinates i on the diagrams, they can be approximated as follows:

$$z_j = f(i) = a_{j0} + a_{j1}i + a_{j2}i^2 + a_{j3}i^3 + \quad (1)$$

$$x_j = g(i) = b_{j0} + b_{j1}i + b_{j2}i^2 + b_{j3}i^3 + \quad (2)$$

The degree to which they are approximated, is determined depending upon a required detection precision. When $a_{jn}$ and $b_{jn}$ (n=0, 1, 2, ...) have been evaluated for all the values of j (for example, j=1–256) on the diagrams by the above method in advance, conversely the z-directional and x-directional positions can be obtained from the detected light segment by the use of Equations (1) and (2). Besides, in case of finding the inclination of one plane forming the object to be detected, an angle defined between the plane and the x-axis can be evaluated from the actual coordinates (x, z) and (x', z') of the end points of the light segment obtained as stated above, by the use of:

$$\theta_x = \tan^{-1} \frac{z' - z}{x' - x} \quad (3)$$

Now, an expedient for extracting the light segment from the detected picture will be concretely explained. Also in this case, the planar light beam 3a on one side shown in FIG. 4 will be referred to. In general, the light segment imaged by the image pickup device 2 has a certain width due to the width of the planar light beam, the defocusing of an optical system, etc. Accordingly, the horizontal scanning direction of the image pickup device 2 is held in agreement with the direction of the line h–h' (lateral direction) shown in FIGS. 8 and 9 and the coordinate i of the light segment at each j (refer to FIG. 12). Thus, the coordinates of the positions of the light segment for calculating Equations (1) and (2) are extracted.

In the next place, the process of detecting the three-dimensional position and posture of the object by means of the robot vision system of the present invention will be explained by exemplifying the detection of a columnar object 9 shown in FIG. 13 and a circular hole 10 in a plane shown in FIG. 14.

Figure 15:
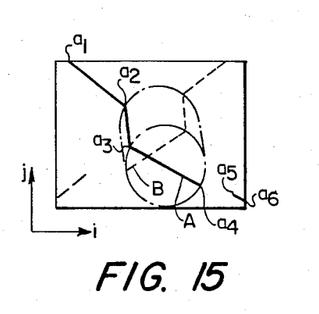
FIG. 15 is a diagram showing an image of intersections between an object to be detected and a pair of planar light beams.
Figure 16:
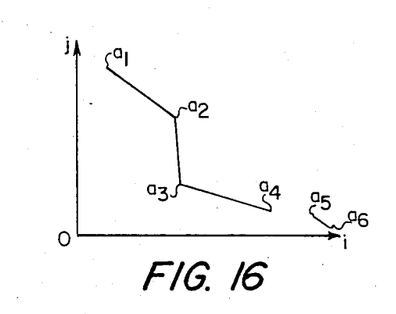
FIG. 16 is a diagram showing the process of image processing for the object to be detected shown in FIG. 13.
Figure 17:
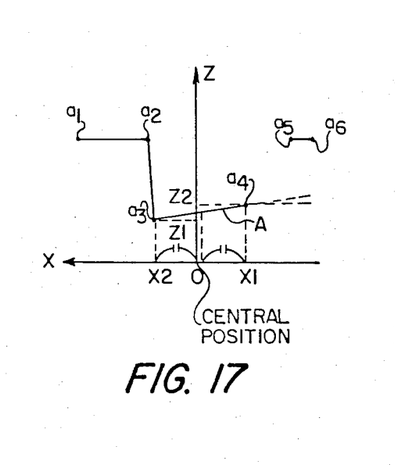
FIG. 17 is a diagram showing the process of image processing for the object to be detected shown in FIG. 13.

First, the method of detecting the position and posture of the columnar object 9 will be described. In case of projecting the planar light beam 3a shown in FIG. 5, it is supposed that a light segment image shown by a solid line A in FIG. 15 by way of example has been detected by the image pickup device 2. When, in the figure, the positions of the brightest points in the lateral direction are detected to extract the shape of the light segment, as explained above, FIG. 16 is obtained. A waveform shown in FIG. 16 is approximated into polygonal lines, and the scanning coordinates (i, j) of the end points of the respective segments are transformed into actual coordinates (x, z) by the use of Equations (1) and (2) previously obtained. Then, FIG. 17 results. In this figure, the approximate central position of the upper surface of the columnar object 9 in the x-direction is obtained from the middle point of the segment A having the smallest z-coordinates, namely the segment closest to the detector. In addition, the inclination of the object 9 in the x-z plane is found using Equation (3). Subsequently, the light sources are switched, and a light segment image (indicated by a broken line B in FIG. 15) is similarly processed, thereby to find the approximate central position of the upper surface of the columnar object 9 in the y-direction and the inclination of the object 9 in the y-z plane. Further, on the basis of the above detection results, the distance z from the detector to the central position of the upper surface of the object 9 is evaluated as follows, when this upper surface of the columnar object 9 is substantially perpendicular to the z-axis:

$$z = \frac{z_1 + z_2}{2} + \frac{z_4 - z_3}{y_2 - y_1} \cdot \frac{y_1 + y_2}{2} \quad (4)$$

or $$z = \frac{z_3 + z_4}{2} + \frac{z_2 - z_1}{x_2 - x_1} \cdot \frac{x_1 + x_2}{2} \quad (5)$$

Figure 18:
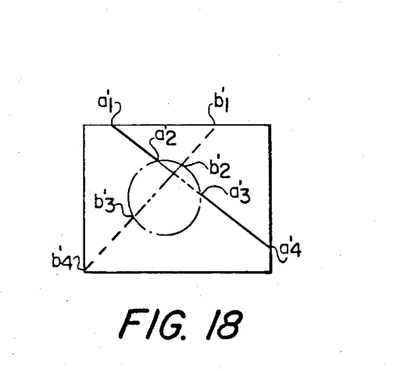
FIG. 18 is a diagram showing the detected picture of the object to be detected shown in FIG. 14.

Here, $x_1$ and $x_2$ denote the x-coordinates of the end points of the light segment image on the x-z plane (A shown in FIG. 15) in the upper surface of the columnar object 9; $y_1$ and $y_2$ the y-coordinates of the end points of the light segment image on the y-z plane (B shown in FIG. 15); and $z_1$, $z_2$, $z_3$ and $z_4$ the z-coordinates of the four end points, respectively. In a case where, on the basis of the above detection results, the inclinations so that the z-axis, i.e., the intersection line of the planar light beams 3a and 3b may become substantially perpendicular to the plane, whereupon the central position and distance are detected again. Secondly, there will be described the method of detecting the central position of the circular hole 10 formed perpendicularly to the plane as shown in FIG. 14 and the direction in which the hole is formed. FIG. 18 is a diagram showing an example of a light segment obtained when the hole 10 shown in FIG. 14 has been imaged by the image pickup device. In this case, similarly to the foregoing example, two light segment images on the x-z plane and y-z plane are independently detected by switching the light sources. Solid and broken lines in FIG. 18 indicate the two light segment images thus obtained. A segment connecting points $a'_2$ and $a'_3$ and a segment connecting points $b'_2$ and $b'_3$ in the figure are respectively subjected to processing corresponding to the segments A and B in FIG. 15 in the foregoing example, whereby the position of the hole 10 and the direction of the formation thereof can be detected quite similary.

Practical embodiments of the robot vision system of the present invention will be described hereunder. The setup of the whole system and the operations thereof will be first explained, whereupon the practicable setups of various parts in the detector will be stated.

Figure 19:
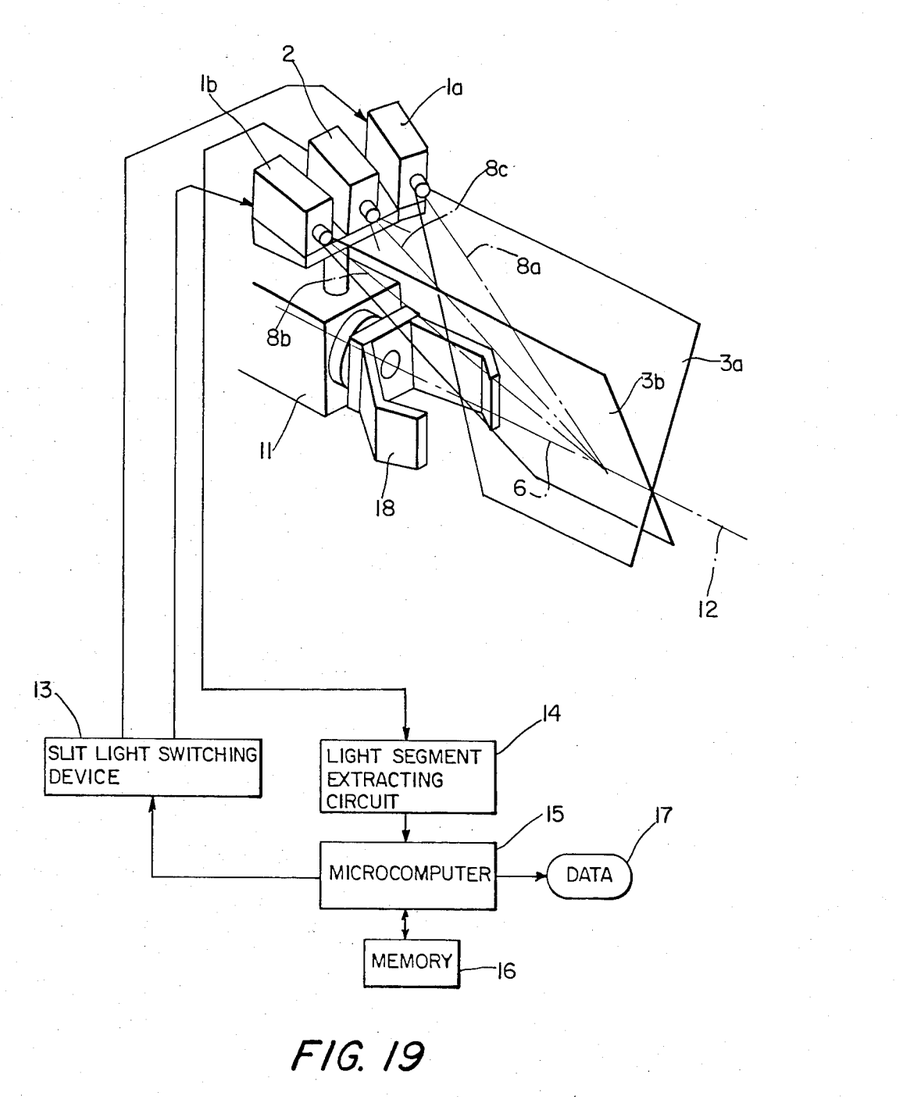
FIG. 19 is a view showing an embodiment of a setup of a robot vision system according to the present invention.

FIG. 19 is a diagram showing an embodiment of the whole setup of the robot vision system of the present invention. The detector is constructed of an image pickup device 2 and light sources 1a, 1b, and is arranged as stated below.

(1) The intersection line 6 between planes formed by two planar light beams 3a, 3b is brought into co-axis alignment with the axis of rotation of a gripper 18 in a robot.

(2) The optic axes 8a, 8b of the respective light sources 1a, 1b and the optic axis 8c of the image pickup device 2 intersect substantially at one point on the intersection line 6 of the planar light beams 3a, 3b.

(3) The optic axes 8a, 8b of the respective light sources 1a, 1b and the optic axis 8c of the image pickup device 2 lie on an identical plane.

(4) The angle defined between the optic axis 8a of the light source 1a and the intersection line 6 between planes formed by two planar light beams 3a, 3b is equal to the angle defined between the optic axis 8b of the light source 1b and the intersection line 6 between planes formed by two planar light beams 3a, 3b.

(5) The angle defined between the optic axis 8a of the light source 1a and the optic axis 8c of the image pickup device 2 is equal to the angle defined between the optic axis 8b of the light source 1b and the optic axis 8c of the image pickup device 2.

In the arrangement stated above, the detector is constructed on a robot arm 11. As modifications of the method of constructing the detector, there are one to four logically-possible combinations of the aforementioned (1)-(5). While, in FIG. 19, the detector is fixed to a portion for rotating and driving the gripper 18 of the robot, it may well be fixed on the gripper 18 so as to be rotated unitarily with this gripper.

And, while in FIG. 19, the embodiment shown has two light sources to alternately project two planar light beams, other embodiments may be constructed with a single light source to alternately project two planar light beams intersecting each other by moving (i.e., rotation) the position of the light source or by using turret lens, containing a slit, or by light filters transmitting different wavelengths, or the like.

The robot vision system is wholly controlled by a microcomputer (or minicomputer) 15 in FIG. 19. It controls a light switching device 13 so that the light sources 1a, 1b may alternately emit the lights. The resulting respective light segment images are detected by the image pickup device 2. A detected picture signal is inputted to a light segment extracting circuit 14, and a light segment waveform is inputted to the microcomputer 15. The light segment extracting circuit 14 compresses two-dimensional picture data into unidimensional waveform data in accordance with the method explained before, and it may be a device disclosed in Japanese Patent Application No. 54-146427. The two sets of light segment waveform data thus obtained are processed in the microcomputer 15 by the procedure explained before. More specifically, after the polygonal line approximation of the waveform data, the calculations of equations (1)-(5) are performed to detect the three-dimensional position and posture of the object. The resulting data 17 are outputted to a control device for the robot arm mechanism. The coefficients $a_{jn}$ and $b_{jn}$ (j=0, 1, 2, 3 ..., n=0, 1, 2, 3 ... ) necessary for calculating Equations (1) and (2) are evaluated by the foregoing method in advance, and are stored in a memory 16. They are occasionally read out and used at need.

Now, the operations of the robot vision system of the present embodiment will be described in detail.

Before detecting the object, the operation of storing the coefficients $a_{jn}$, $b_{jn}$ indicated in Equations (1), (2) (and coefficients $y_j$ similarly obtained) in the memory 16 is required as already explained. Using the appliance shown in FIG. 7, the robot is moved and then fixed so that the intersection line 6 of the planar light beams may become parallel to the rail 8. Under this condition, the equidistant line diagram shown in FIG. 8 and the equibroad line diagram shown in FIG. 9 are obtained by the methods already explained. By switching the two planar light beams 3a, 3b with the switching device 13, this operation is performed for each of the planar light beams. Subsequently, on the basis of these data, polynomial approximations are performed by the microcomputer 15, to find the coefficients $a_{jn}$, $b_{jn}$ of Equations (1), (2) at the respective j values. They are stored in the memory 16.

Figure 13:
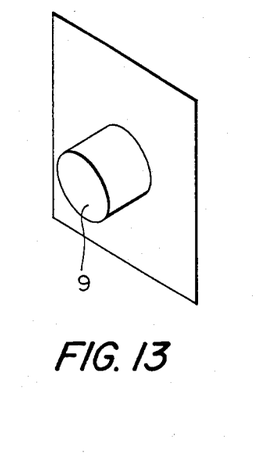
FIG. 13 is a view showing an example of an object to be detected.
Figure 14:
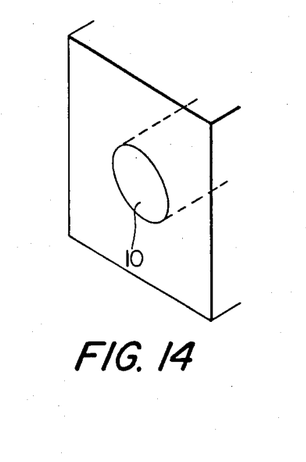
FIG. 14 is a view showing another example of an object to be detected.

In the process of detecting the object to be handled, as already explained by taking the exmaples of FIGS. 13 and 14, the light segment waveforms based on the light segment images in the case where the microcomputer 15 controls the light switching device 13 so as to cause the two light sources 1a, 1b to emit lights respectively, are produced by the light segment extracting circuit 14 and are subjected to the polygonal line approximations by the microcomputer 15. Thereafter, the actual positional coordinates of the respective segments are evaluated on the basis of the coefficients $a_{jn}$, $b_{jn}$ stored in the memory 16 and by the use of Equations (1), (2) (and a similar equation for obtaining $y_j$). From among the segments in the case of causing the two light sources 1a, 1b to emit the planar light beams respectively, the microcomputer 15 selects one segment on the object for each light source, with the distance z as a criterion (usually, the segment which is nearest to the detector and which lies near the middle of the field of view). On the basis of the four end points of such two segments, the microcomputer computes Equations (3)-(5) and the middle points of the segments, to detect the position and posture of the object and to output them to the control device of the robot arm mechanism.

There will now be described the practical setups of the various parts of the detector.

Figure 12:
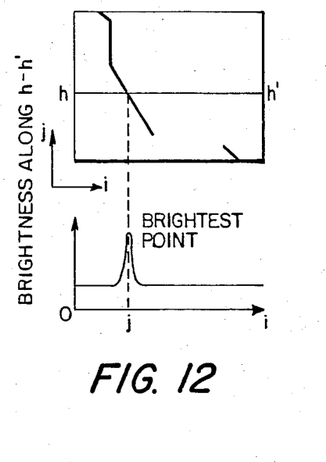
FIG. 12 is a diagram illustrative of a method of extracting a light segment.
Figure 20:
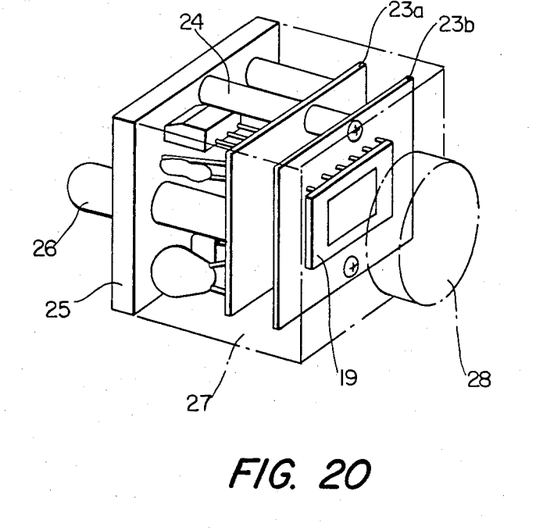
FIG. 20 is a view showing a practical embodiment of an image pickup device for use in the robot vision system of the present invention.
Figure 21:
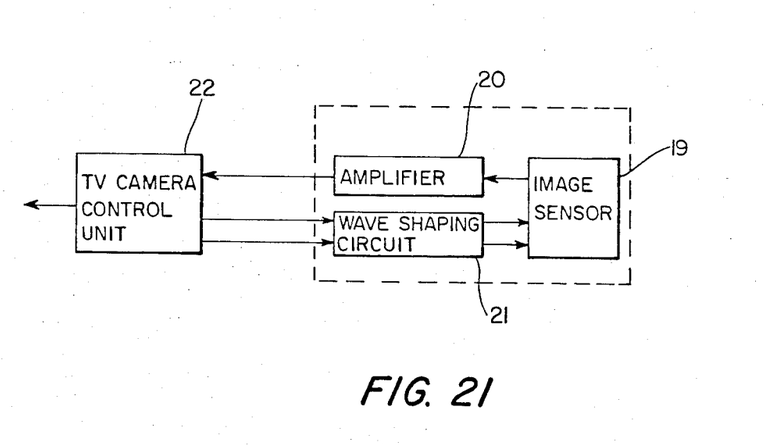
FIG. 21 is a block diagram of the image pickup device shown in FIG. 20.

A TV camera is employed as the image pickup device 2, and it can detect the light segment at high speed by bringing the horizontal scanning direction into agreement with the direction of i indicated in FIG. 12. Of course, it is allowed to use a two-dimensional picture detector other than the TV camera, for example, the combination of a linear photodiode array and a galvano-scanning mirror amoung the TV cameras, especially one employing an areal solid-state image sensor is superior to one employing an electron tube in the five points of (i) earthquake-proof and shock resistance, (ii) lifetime, (iii) picture distortion, (iv) small size and light weight, and (v) saving in electric power. FIG. 20 is a view showing a practical embodiment of the image pickup device employing such areal solid-state image sensor 19, a picture signal pre-amplifier 20 and a synchronous drive signal waveshaping circuit 21, as shown in FIG. 21. A TV camera control unit 22 will not typically be carried by the robot arm. Thus, the image pickup device is rendered still smaller in size and light in weight. In the setup of FIG. 20, the picture signal preamplifier 20 is mounted on a substrate 23a, while the areal solid-state image sensor 19 and the synchronous drive signal waveshaping circuit 21 are mounted on a substrate 23b. These substrates are fixed on a rear cover 25 by a stanchion 24. The rear cover 25 has a connector 26 attached thereto, through which all signals and power sources are supplied. The rear cover 25 and an outer frame 27 are made of a nonmetal such as plastics, the inner surfaces of which have copper foils stuck for electrostatic shielding (or are plated with a metal). Further, it is possible to use an imaging lens 28 made of plastics. As thus far described, when the image pickup device according to the present embodiment is used, there is the effect that the detector can be made remarkably small in size and light in weight, in addition to the features of earthquake-proof and shock resistance, long lifetime, low picture distortion and saving in electric power.

Figure 22A:
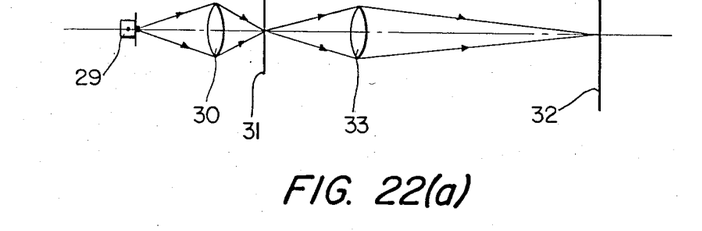
FIG. 22(a) is a plan view showing a practical embodiment of a slit light source which is used in a detector in a robot vision system.
Figure 22B:
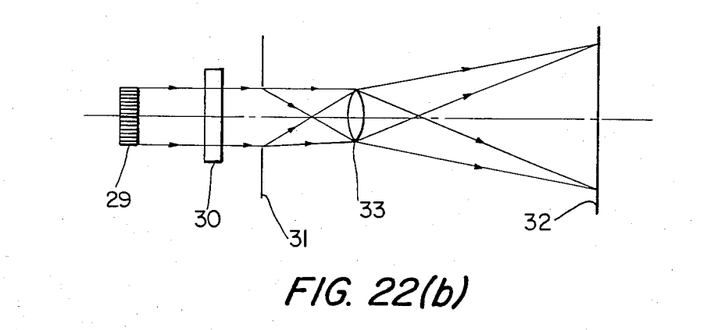
FIG. 22(b) is a front view corresponding to FIG. 22(a).

Now, the practical setups of the light sources 1a, 1b will be explained. A halogen lamp, a discharge tube, a light emitting diode, etc. can be used as the light source, but the light emitting diode is the most excellent in the three points of (i) earthquake-proof and shock resistance, (ii) lifetime and (iii) small size and light weight. FIGS. 22(a) and 22(b) show a practical embodiment of the light source employing the light emitting diode. As the light emitting diode 29, a high power type emitting infrared radiation is used. Usually, the maximum sensitivity wavelength of the areal solid-state image sensor is near 800 nm. Therefore, when the light emitting diode of this wavelength is used, the detection sensitivity can be maximized. As illustrated in FIG. 22(b), a plurality of such light emitting diodes 29 are arrayed in a row in agreement with the lengthwise direction of a cylindrical lens 30. In the plan view of FIG. 22(a), the light emitting diodes 29 and a slit 31 are in imaging relationship with respect to the cylindrical lens 30. In addition, the position of an imaging plane 32 is set at the rough position of the object, and the imaging plane 32 and the slit 31 lie in imaging relationship with respect to an imaging lens 33. Owing to the setup as stated above, the planar light beam can be formed by efficiently condensing lights emitted from the light emitting diodes 29. Therefore, the light source which is bright besides the aforementioned three features can be realized. Further, when a type of high directivity employing a lens is used as the light emitting diode 29, a more powerful light source can be realized.

Figure 23A:
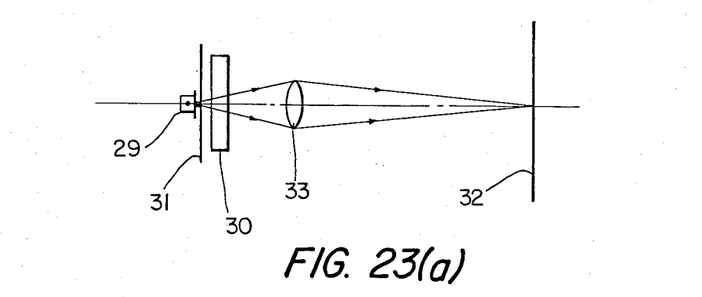
FIG. 23(a) is a plan view showing another practical embodiment of a slit light source which is used in a detector in a robot vision system.
Figure 23B:
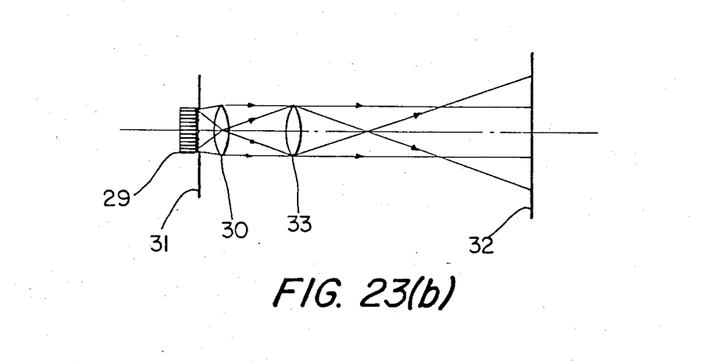
FIG. 23(b) is a front view corresponding to FIG. 23(a).

FIGS. 23(a) and 23(b) show another practical embodiment of the light source employing the light emitting diode. As shown in these figures, a plurality of light emitting diodes 29 are arranged along a slit 31, and the slit 31 and an imaging plane 32 lie in imaging relationship with respect to an imaging lens 33. In addition, a cylindrical lens 30 is inserted between the imaging lens 33 and the slit 31 so as to prevent the slit light from becoming non-uniform on the imaging plane 32. Although the present embodiment has the drawback that the planar light beam becomes non-uniform when the imaging relationship of the imaging plane 32 deviates, it can be ignored in the present invention for detecting the position of the light segment. As apparent by comparing these figures with FIGS. 22(a) and 22(b), the present embodiment can reduce the length in the optical axis direction. This brings forth the feature that the light source can be made remarkably small in size, besides the features possessed by the light emitting diodes 29.

When the outer frame of the light source is made of a nonmetal such as plastics, as in an image pickup device, there is the effect that the detector can be rendered conspicuously small in size and light in weight.

In the practical embodiments of the light sources shown in FIGS. 22(a), 22(b) and FIGS. 23(a), 23(b), the planar light beam does not become perfectly flat in some cases. This problem can be avoided in such a way that the diameter of the imaging lens 33 is not unnecessarily made large.

According to the present invention, light sources are so arranged that two planar light beams intersect each other, and respective light segments thus obtained are analyzed, whereby the positions and postures of an object to be handled in two non-parallel planes can be detected without moving a detector or the object. This brings forth the effect that the three-dimensional position and posture of the object can be detected at high speed.

Since two planar light beams are obtained from two light sources arranged in the shape of letter V, an image pickup device and the light sources can be made unitary. This permits a small-sized, light-weight detector to be attained, and allows detection to occur without operation of the detector being effected by the gripper of a robot or an object grasped by the gripper. Moreover, light segments in two non-parallel planes are detected by the single image pickup device. This assures that the detector can be made small in size and light in weight.

Further, use of the light segmentation method, on which the present invention is grounded, permits the detection of the position and posture of an object without operation or accuracy being effected by the contrast, color or surface condition of the object.

We claim:

1. An apparatus for detecting the position and posture of an object, comprising:
   means having first and second optical axes for alternatively projecting two intersecting planar light beams coplanar with respective ones of said first and second axes, upon an object with the planes of said light beams intersecting along a first line, said first line of intersection being pointed toward the object;
   image sensor means positioned between the planar light beams, for forming two-dimensional images from intersections of said planar light beams and said object;
   means coupled to said forming means, for extracting scanning coordinates of said intersections; and
   means coupled to said extracting means, for computing three dimensional actual coordinates from said scanning coordinates whereby the position and posture of said object is described by said actual coordinates.

2. The apparatus of claim 1, wherein said image sensor means has a single image pickup device for forming the two-dimensional images.

3. The apparatus of claim 2, further comprising:
   means for transmitting said three dimensional actual coordinates to a controller of a device supporting said apparatus.

4. The apparatus of claim 1, wherein said image sensor means exhibits a third optical axis obliquely oriented toward said first line.

5. The apparatus of claim 4, wherein said third optical axis is positioned on a plane equally dividing an angle included between the planar light beams.

6. The apparatus of claim 5, wherein said image sensor means includes an areal solid-state image sensor.

7. The apparatus of claim 6, wherein said projecting means has a plurality of light emitting diodes.

8. The apparatus of claim 4, wherein said first, second and third optic axes lie on a single plane.

9. The apparatus of claim 1, wherein a straight line formed by the intesection of said planar light beams is in co-axial alignment with an axis of rotation of a rotatable member of the device.

10. The apparatus of claim 9, wherein said two intersecting planar light beams intersect orthogonally.

11. The apparatus of claim 10, wherein said image sensor means has a detection portion having an optical axis positioned on a plane equally dividing an angle included between the planar light beams.

12. The apparatus of claim 11, wherein said image sensor means includes an areal solid-state image sensor.

13. The apparatus of claim 9, wherein said first, second and third optic axes lie on a single plane.

14. An apparatus for detecting the position and posture of an object, comprising:
a first light source having a first optical axis, to project a first planar light beam coplanar with the first optical axis toward an object;
a second light source having a second optical axis, to project toward said object a second planar light beam coplanar with the second optical axis, with the planes of said first and second light beams intersecting along a first line, said first line being pointed toward the object;
an image pickup device positioned between the planes of said light beams to form in a two dimensional coordinate system images of intersection lines projected upon said object by said light beams;
means for alternately energizing said first and second light sources;
a light segment extracting circuit coupled to said pickup device to scan said images and detect scanning coordinates of edges of said object along the intersection lines;
a memory device to store corresponding relationships between said two dimensional coordinate system and a three dimensional actual coordinate system; and
a computing device using the corresponding relationships to determine from said scanning coordinates actual coordinates of said edges in said three dimsnsional coordinate system and thereby provide an indication of the position and posture of said object in said three dimensional coordinate system.

15. The apparatus of claim 14, wherein said scanning coordinates are provided to said computing device solely by said single light segment extracting circuit.

16. The apparatus of claim 15, further comprising means for transmitting said actual coordinates to a controller of a device supporting said apparatus.

17. The apparatus of claim 14, wherein said image pickup device exhibits a third optical axis obliquely oriented toward said first line.

18. The apparatus of claim 17, wherein said third optical axis is positioned on a plane equally dividing an angle included between said first planar light beam and said second planar light beam.

19. The apparatus of claim 18, wherein said image pickup device has an areal solid-state image sensor.

20. The apparatus of claim 19, wherein said first and second light sources contain a plurality of light emitting diodes generating said first and second planar light beams.

21. The apparatus of claim 14, wherein said first line comprises a straight line formed by the intersection of the planes of said first planar light beam and said second planar light beam, in co-axial alignment with an axis of rotation of a rotatable member of the device.

22. The apparatus of claim 21, wherein said first planar light beam and said second planar light beam intersect orthogonally.

23. The apparatus of claim 22, wherein said image pickup device has a third optical axis positioned on a plane equally dividing an angle included between said first planar light beam and said second planar light beam.

24. The apparatus of claim 23, wherein said image pickup device has an areal solid-state image sensor.

25. The apparatus of claim 21, wherein said image pickup device exhibits a third optical axis and said first, second and third optical axes lie on a single plane.

26. The apparatus of claim 14, wherein said image pickup device exhibits a third optical axis and said first, second and third optical axes lie on a single plane.

27. A method of detecting the position and posture of an object, comprising the steps of:
alternately projecting toward an object a first planar light beam having a first optical axis and a second planar light beam having a second otpical axis and intersecting the plane of said first light beam along a first line;
pointing said first line toward the object;
producing in a two dimensional coordinate system images of intersection lines formed on said object by said light beams with a photo-sensitive device exhibiting a third optical axis obliquely oriented toward said first line;
extracting sets of scanning coordinates of edges of said object from said images of said intersection lines; and
computing in a three dimensional coordinate system actual coordinates of said object from the sets of said scanning coordinates by using corresponding relationships between said two dimensional and three dimensional coordinate systems.

28. The method of claim 27, wherein said images are produced by a single photo-responsive device.

29. The method of claim 28, further comprising:
storing the corresponding relationships in a memory; and
reading said corresponding relationships from said memory while computing said actual coordinates.

30. The method of claim 29, wherein said step of projecting includes a step of alternately energizing a first light source which projects the first planar light beam and a second light source which projects the second planar light beam.

31. The method of claim 29, wherein said step of computing includes:

a step of computing an approximate central position of the object and an inclination of the object in an x-direction;

a step of computing an approximate central position of the object and an inclination of the object in a y-direction; and a step of computing a central position of the object and a distance from the apparatus to the central position of the object by using the approximate central positions and the inclination of the object.

32. The method of claim 27, further comprised of placing said first, second and third optical axes in a single plane.

* * * * *